US009831656B2

(12) United States Patent
Carlino et al.

(10) Patent No.: US 9,831,656 B2
(45) Date of Patent: Nov. 28, 2017

(54) CIRCUIT INTERRUPTION APPARATUS PROVIDING AUTOMATIC REDUCED ARC MODE AND METHODS OF OPERATING THE SAME

(71) Applicant: Eaton Corporation, Cleveland, OH (US)

(72) Inventors: Harry James Carlino, Export, PA (US); David Richard Olenak, Bridgeville, PA (US)

(73) Assignee: Eaton Corporation, Cleveland, OH (US)

( * ) Notice: Subject to any disclaimer, the term of this patent is extended or adjusted under 35 U.S.C. 154(b) by 510 days.

(21) Appl. No.: 14/574,864

(22) Filed: Dec. 18, 2014

(65) Prior Publication Data

US 2016/0181782 A1    Jun. 23, 2016

(51) Int. Cl.
*H02H 3/00* (2006.01)
*H02H 3/08* (2006.01)
*H01H 71/12* (2006.01)
*H02H 1/04* (2006.01)
*H01H 71/10* (2006.01)
*H01H 71/74* (2006.01)

(52) U.S. Cl.
CPC ............ *H02H 3/08* (2013.01); *H01H 71/123* (2013.01); *H02H 1/04* (2013.01); *H01H 71/1081* (2013.01); *H01H 71/7463* (2013.01)

(58) Field of Classification Search
CPC ....................................................... H02H 3/08
USPC .......................................................... 361/87
See application file for complete search history.

(56) References Cited

U.S. PATENT DOCUMENTS

| 3,662,220 | A |   | 5/1972  | Riebs |                |
|-----------|---|---|---------|-------|----------------|
| 3,777,240 | A | * | 12/1973 | Neill | ...... H02H 7/224 |
|           |   |   |         |       | 318/471        |
| 5,969,921 | A | * | 10/1999 | Wafer | ...... H02H 7/30 |
|           |   |   |         |       | 361/45         |
| 7,203,040 | B2| * | 4/2007  | Shipp | ...... H02H 9/00 |
|           |   |   |         |       | 361/5          |

(Continued)

OTHER PUBLICATIONS

International Search Report and Written Opinion Corresponding to International Application No. PCT/US2015/064196; dated Apr. 18, 2016; 16 Pages.

(Continued)

*Primary Examiner* — Stephen W Jackson
(74) *Attorney, Agent, or Firm* — Myers Bigel, P.A.

(57) ABSTRACT

A circuit interruption device (e.g., a molded case circuit breaker) includes at least one set of contacts, a contact actuator mechanism configured to open the at least one set of contacts and a trip control circuit configured to cause the contact actuator mechanism to open the at least one set of contacts responsive to a condition satisfying a first trip criterion and to apply a second trip criterion (e.g., a lower current level trip threshold) responsive to the opening of the at least one set of contacts. The trip control circuit may be configured to apply the second trip criterion after a succeeding closure of the at least one set of contacts. The trip control circuit may be further configured to return to application of the first trip criterion after lapse of a predetermined interval following the succeeding closure of the at least one set of contacts.

21 Claims, 5 Drawing Sheets

(56) References Cited

U.S. PATENT DOCUMENTS

| | | | |
|---|---|---|---|
| 7,697,247 B2* | 4/2010 | Maharsi | H01H 9/542 361/13 |
| 8,508,891 B2 | 8/2013 | Carlino et al. | |
| 2001/0034568 A1 | 10/2001 | Egolf et al. | |
| 2009/0195337 A1 | 8/2009 | Carlino et al. | |

OTHER PUBLICATIONS

Toth et al. "Enhanced Sectionalizing Through Proper Testing of Recloser Time Current Curves", Papers Presented at the $38^{th}$ Annual Conference on Rural Electric Power, IEEE, Colorado Springs, CO, USA, Apr. 24, 1994, pp. B5/1-B5/7.

Witte et al. "Computer-Aided Recloser Applications for Distribution Systems", IEEE Computer Applications in Power, IEEE Inc., vol. 5, No. 3, Jul. 1992, pp. 27-32.

* cited by examiner

CIRCUIT INTERRUPTION APPARATUS PROVIDING AUTOMATIC REDUCED ARC MODE AND METHODS OF OPERATING THE SAME

BACKGROUND

The inventive subject matter relates to circuit interruption devices and methods of operating the same and, more particularly, to circuit interrupters providing a reduced-arc trip mode and methods of operating the same.

Circuit breakers are commonly used to protect circuitry, such as distribution wiring, from overheating due to short circuits or overloads. Circuit breakers typically include at least one set of contacts that is configured to be opened and closed by an actuator mechanism. The actuator mechanism is typically configured open and close the contacts in response to a manual or other mechanical input (e.g., by movement of a motorized actuator), and is further configured to rapidly open in response to an input from a trip unit.

Circuit breaker trip units may operate in a number of ways. For example, trip units for thermal magnetic breakers typically trip breaker contacts in response to current in and temperature of conductors in the breaker. Such trip units may use current transformers to sense currents for so-called "instantaneous" current-level tripping, and may use mechanical and/or electromechanical devices to provide thermal tripping.

Some circuit breakers provide adjustable instantaneous current settings wherein the current at level at which the breaker trips may be manually adjusted using a selector switch or similar device. Such adjustability may be desirable to prevent unwanted tripping due to, for example, momentary inrush currents produced by large motors or other equipment. An example of a molded case circuit breaker (MCCB) providing adjustable instantaneous tripping is described in U.S. Patent Application Publication No. 2009/0195337 to Carlino et al.

In some applications it may be desirable to place a circuit breaker into a maintenance mode in which closure of the breaker into a fault will result in minimized arc energy. For example, in some mining environments, it is a common practice to reclose a tripped breaker to determine whether a fault on the circuit has been cleared. Closure into a fault at a high instantaneous trip setting may result in significant arc flash. Operating the circuit breaker in a maintenance mode wherein the instantaneous trip setting is placed into a relatively low trip current level can reduce this risk. U.S. Pat. No. 8,508,891 to Carlino et al. describes a circuit breaker having an arc reduction maintenance mode that can be commanded from an external source.

SUMMARY

Some embodiments of the inventive subject matter provide a circuit interruption device (e.g., a molded case circuit breaker) including at least one set of contacts, a contact actuator mechanism configured to open the at least one set of contacts and a trip control circuit configured to cause the contact actuator mechanism to open the at least one set of contacts responsive to a condition satisfying a first trip criterion and to apply a second trip criterion responsive to the opening of the at least one set of contacts. The trip control circuit may be configured to apply the second trip criterion after a succeeding closure of the at least one set of contacts. The trip control circuit may be further configured to return to application of the first trip criterion after lapse of a predetermined interval following the succeeding closure of the at least one set of contacts. The first trip criterion may correspond to a first current level and the second trip criterion may correspond to a second current level less than the first current level.

According to some embodiments, the first trip criterion may be user-selectable. For example, the first and second trip criteria may be members of a set of user-selectable trip criteria. The members of the set of user-selectable criteria may correspond to respective current levels and the second trip criterion may correspond to a minimum current level associated with the set of user-selectable trip criteria. The trip control circuit may be configured to override a user selection of a trip criterion for a predetermined interval following the closure of the at least one set of contacts.

In some embodiments, the trip control circuit may include a selector switch configured to selectively connect a first terminal to a plurality of second terminals corresponding to a plurality of user-selectable trip criteria. The trip control circuit may be configured to bypass the selector switch responsive to opening of the at least one set of contacts to apply the second trip criterion.

In some embodiments, the circuit interruption device may further include an auxiliary switch having an input terminal and first and second output terminals and having a first state wherein the input terminal is connected to the first output terminal and a second state wherein the input terminal is connected to the second output terminal. The auxiliary switch may be configured to indicate a state of the at least one set of contacts such that the auxiliary switch is in the first state when the at least one set of contacts is open and in the second state when the at least one set of contacts is closed. The trip control circuit may include a first relay having contacts configured to couple and decouple the first terminal of the selector switch and one of the second terminals of the selector switch corresponding to the second trip level and including a coil having a first terminal coupled to the first output terminal of the auxiliary switch. The trip control circuit may further include a second relay having contacts configured to couple and decouple the first terminal of the coil of the first relay and the second output terminal of the auxiliary switch. A timer circuit has a power supply terminal coupled to the second output terminal of the auxiliary switch and, may be configured to drive a coil of the second relay. The input terminal of the auxiliary switch may be configured to receive an enable signal from a source external to the circuit interruption device. In some embodiments, transition of the auxiliary switch from the first state to the second state may cause provision of power to the timer circuit, energization of the coil of the second relay by the timer circuit to close the contacts of the second relay and thereby energize the coil of the first relay, and de-energization of the coil of the second relay by the timer circuit after the predetermined interval to open the contact of the second relay and de-energize the coil of the first relay.

In further embodiments, an apparatus, such as a trip unit or similar component of a circuit interruption device, includes a selector circuit configured to accept user selection of a first trip criterion and a trip control circuit coupled to the selector circuit and configured to generate a trip signal to open a set of circuit interruption device contacts based on the selected first trip criterion and to apply a second trip criterion responsive to the opening of the circuit interruption device contacts.

In further embodiments, methods of operating a circuit interruption device include opening at least one set of contacts of the circuit interruption device responsive to a condition satisfying a first trip criterion and applying a second trip criterion for opening of the at least one set of contacts responsive to the opening of the at least one set of contacts. Applying a second trip criterion for opening of the at least one set of contacts responsive to the opening of the at least one set of contacts may include applying the second trip criterion after a succeeding closure of the at least one set of contacts. The methods may further include returning to application of the first trip criterion after lapse of a predetermined interval following the succeeding closure of the at least one set of contacts.

DETAILED DESCRIPTION

Figure 1:
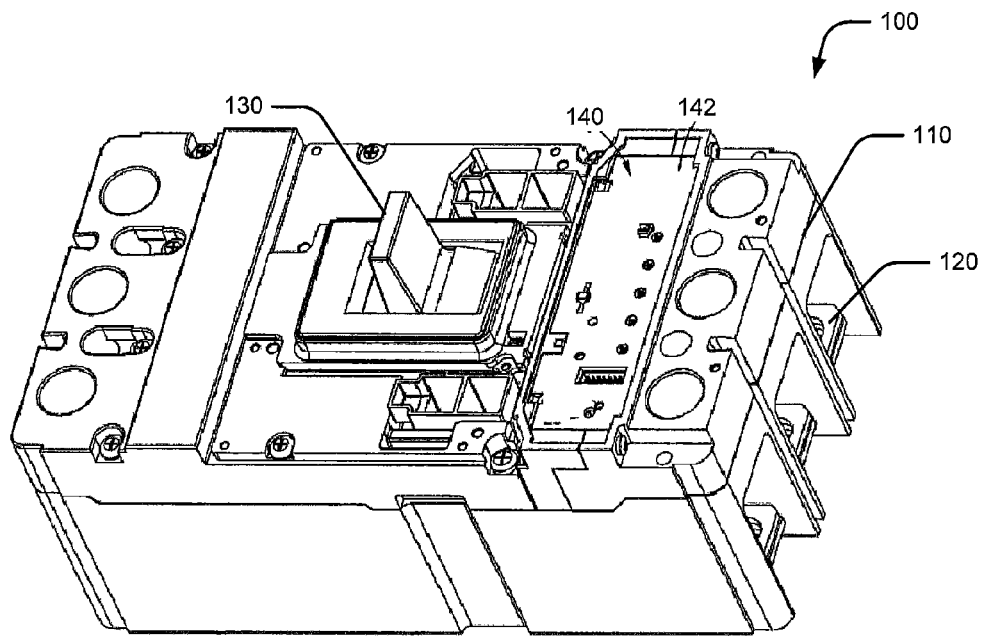
FIGS. 1 and 2 illustrate a molded case circuit breaker (MCCB) according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
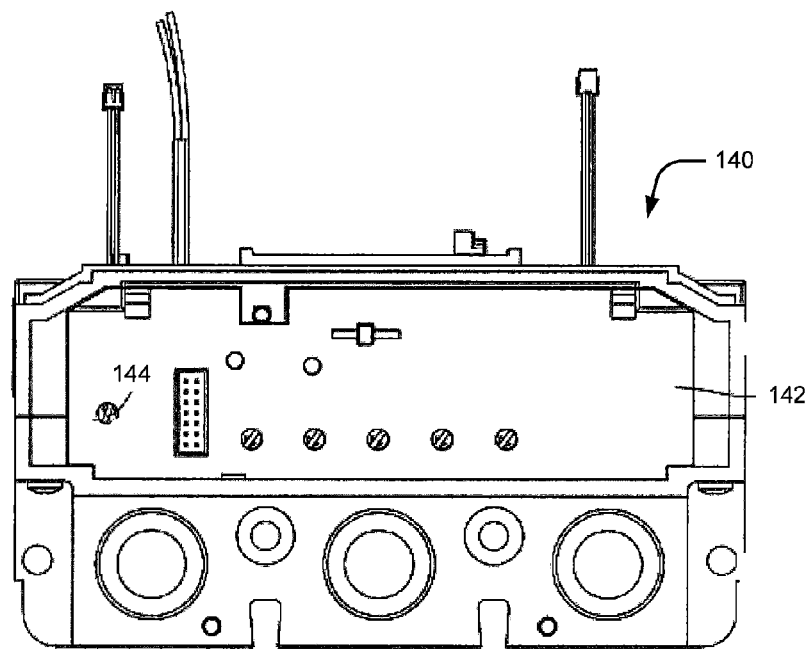

FIGS. 1 and 2 illustrate a three-phase molded case circuit breaker (MCCB) 100 according to some embodiments of the inventive subject matter. The circuit breaker 100 includes a case 110 that houses sets of contacts for interrupting currents in conductor connected to terminals 120. Also within the circuit breaker case 110 is a contact actuator mechanism configured to open and close the sets of contacts. The breaker 100 includes an operating lever 130, which facilitates manual operation of the contact actuator mechanism within the case 110, such that a user may open and close the sets of contacts by moving the lever 130.

The circuit breaker 100 further includes a trip unit 140, which is configured to automatically trip the contact actuator mechanism to open the sets of contacts in response to certain conditions, such as a short circuit or overload condition. The trip unit 140 is further configured to automatically provide an automatic reduced arc mode responsive to state of the contacts of the breaker. For example, in some embodiments, this automatic reduced arc mode may be triggered by opening of the circuit breaker contacts and may be maintained for a certain time interval after the contacts are closed, thus reducing risks associated with closing the contacts into a circuit fault. As further shown, the trip control circuitry may be adjustable to provide different instantaneous trip criteria (e.g., current levels) using a selector switch 144 mounted at a face 142 of the trip unit 140. The automatic reduced arc mode may override a user-selected trip criterion, and the trip criterion used in the reduced arc mode may be one of the selectable trip criteria.

Figure 3:
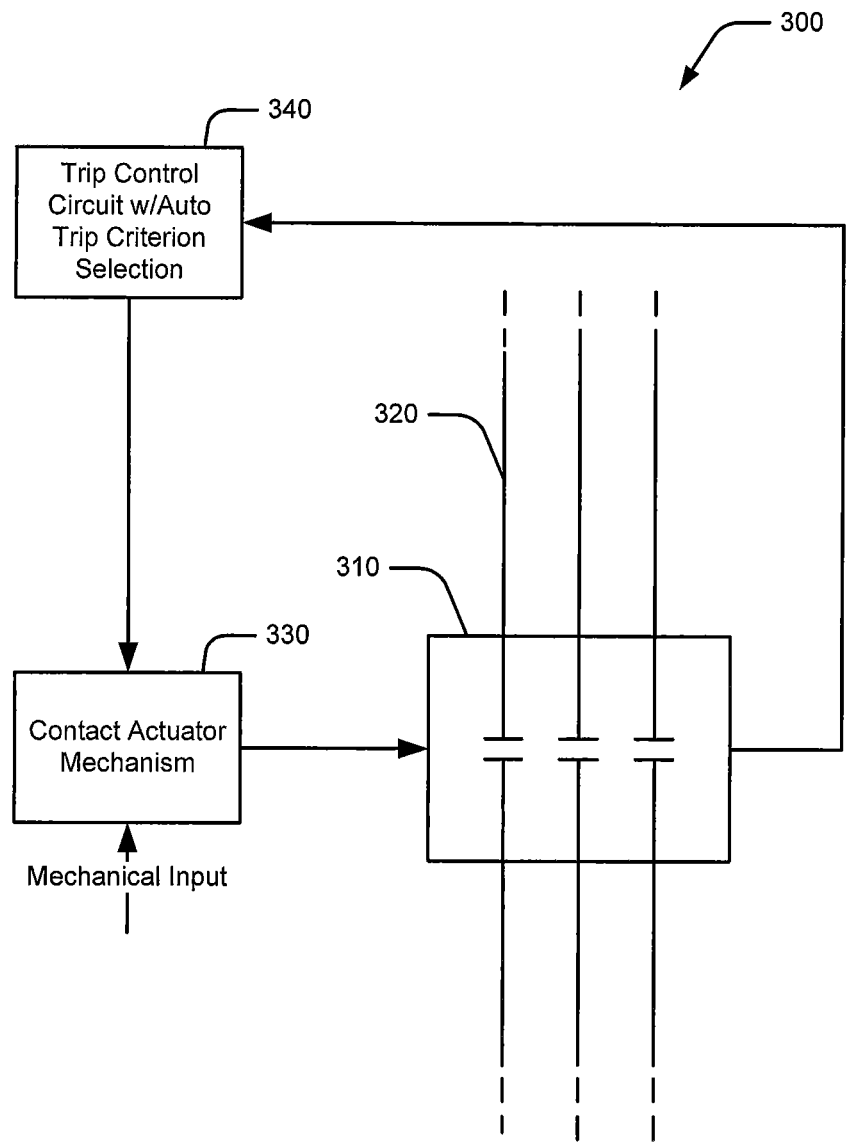
FIG. 3 is a schematic block diagram illustrating a circuit interruption device with a trip control circuit having an automatic trip criterion selection capability according to some embodiments.

FIG. 3 schematically illustrates a circuit interruption device 300 according to some embodiments of the inventive subject matter. The illustrated circuit interruption device 300 is a three-phase device including sets 310 of contacts coupled in line with conductors 320. A contact actuator mechanism 330 is configured to open and close the contact sets 310 responsive to a mechanical input. This mechanical input may include, for example, a manual input provided by a device such as the lever 130 shown in FIG. 1, and/or a mechanical input from a motor or other mechanical actuator.

A trip control circuit 340 is configured to cause the contact actuator mechanism to open the contact sets 310 responsive to at least one trip criterion, such as a magnitude of a current passing through the conductors 320, a temperature of the conductors 320, or the like. According to some embodiments of the inventive subject matter, the at least one criterion used by the trip control circuit 340 may be selected responsive to a state of the contact sets 310. For example, as discussed in detail below, the trip control circuit 340 may apply a first trip criterion for opening of the contact sets 310 and may then apply a second criterion that can minimize or reduce arc flash for an immediately succeeding closure of the contact sets 310 and a certain period thereafter. In this manner, the circuit interruption device 300 may provide an automatic reduced arc mode when the contact sets 310 reclose to help reduce the likelihood of personnel injury and equipment damage if contact sets 310 are closed into a fault.

The circuit interruption device 300 may, for example, take the form of the MCCB 100 illustrated in FIGS. 1 and 2, but it will be appreciated that circuitry shown in FIG. 3 may also be implemented in any of a variety of other types of circuit interruption devices. It will be further appreciated that some embodiments may be implemented in circuit interruption devices having a different number of phases (e.g., single phase devices) and in direct current (DC) circuit interruption devices.

Figure 4:
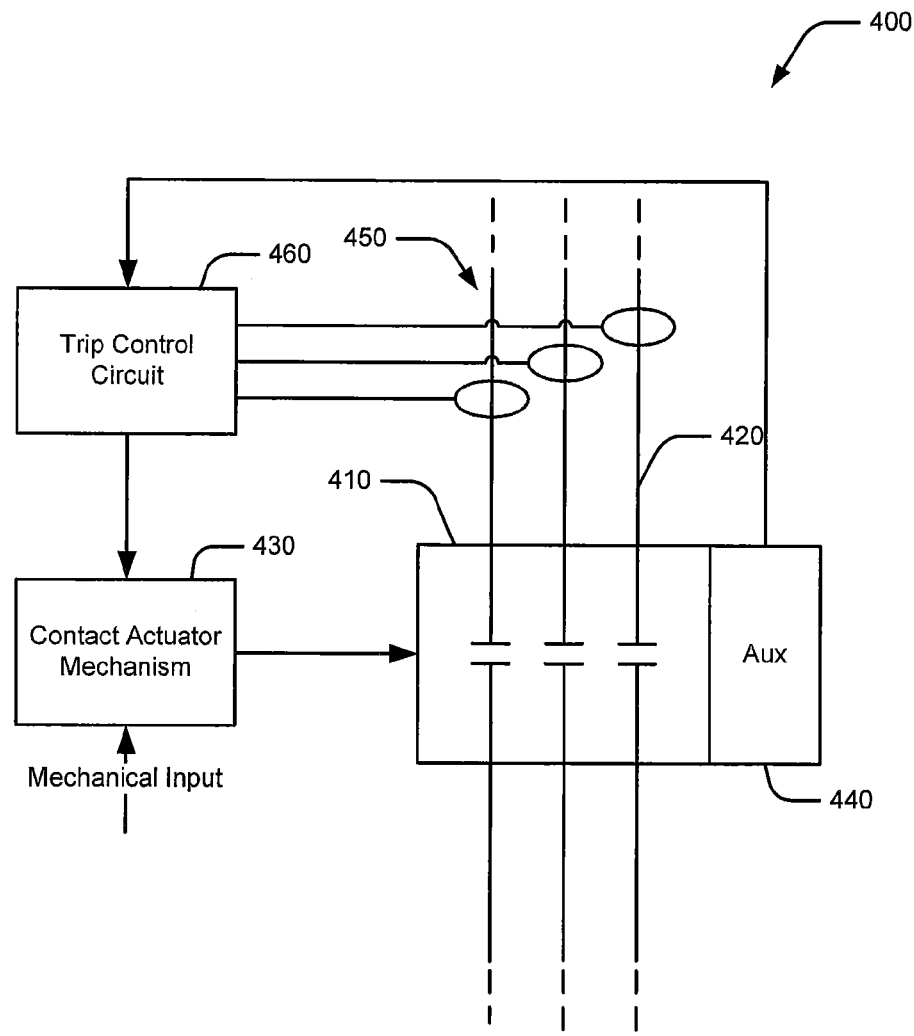
FIG. 4 is a schematic block diagram illustrating a circuit interruption device including an automatic trip criterion selector circuit that operates response to an auxiliary switch according to further embodiments.

FIG. 4 illustrates a circuit interruption device 400 according to further embodiments. The circuit interruption device 400 includes contact sets 410, conductors 420 coupled to the contact sets 410 and a contact actuator mechanism 430 along the lines discussed above with reference to FIG. 3. The circuit interruption device 400 further includes an auxiliary switch 440 that is configured to indicate the state of the contact sets 410, e.g., the auxiliary switch 440 may be mechanically coupled to the contact sets 410 such that the auxiliary switch 440 transitions between first and second states responsive to opening and closing of the contact sets 410.

The circuit interruption device 400 further includes current sensors 450, which are configured to sense currents in the conductors 420 coupled to the contact sets 410. The current sensors 450 may include, for example, current transformers (CTs), Hall sensors or other current sensing devices. Current sense signals generated by the current sensors 450 are provided to a trip control circuit 460, which is configured to control the contact actuator mechanism 430 responsive to the current sense signals. In particular, the trip control circuit 460 is configured to cause the contact actuator mechanism 430 to open the contact sets 410 when the current sense signals meet a trip criterion. The trip control circuit 460 is configured to select the trip criterion applied by the trip control circuit 460 responsive to the auxiliary switch 440, the state of which indicates the state of the contact sets 410.

Figure 5:
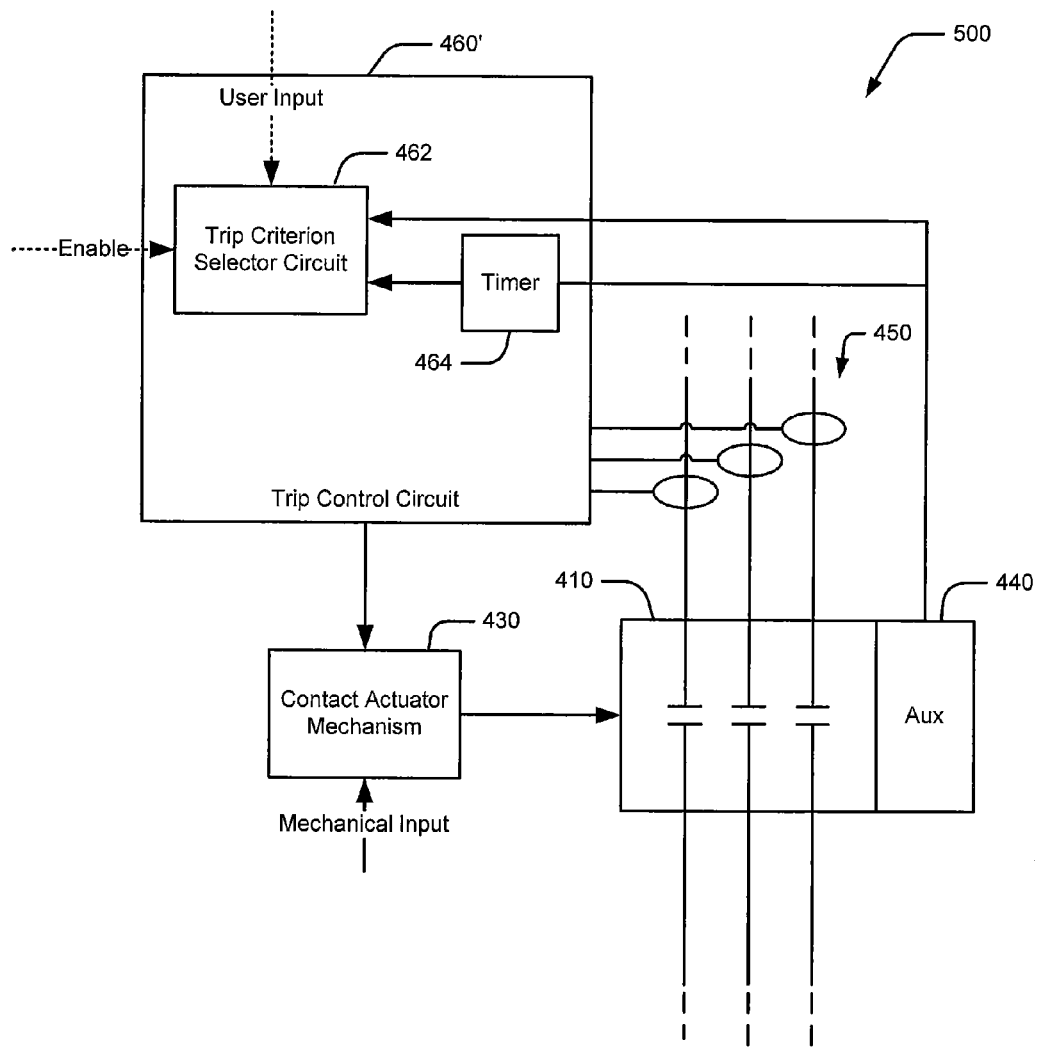
FIG. 5 is a schematic block diagram illustrating a circuit interruption device including a timer-controlled automatic trip criterion selector circuit according to some embodiments.

According to some embodiments, a trip control circuit may be configured to accept a user selection of a trip criterion, such as a current level for instantaneous tripping, and automatic trip criterion selection operations along the lines described above may be used to momentarily override a user-selected trip criterion. Referring to FIG. 5, a circuit interruption device 500 includes a trip control circuit 460' that incorporates a trip criterion selector circuit 462. The trip criterion selector circuit 462 is configured to select at least one trip criterion responsive to a user input provided via a device, such as a selector switch included in the device 500 and/or an external switch or other signal source. The trip control circuit 460' is configured to cause opening of contact sets 410 responsive to the selected at least one trip criterion. The trip criterion selector circuit 462 is further configured to temporarily apply a trip criterion other than the user-selected criterion responsive a state of an auxiliary switch 440 associated with the contact sets 410, thus allowing the user-selected criterion to be temporarily overridden based on the state of the contact sets 410. The length of time for which the user-selected criterion is overridden may be determined by a timer circuit 464 operatively coupled to the selector circuit 462. According to further embodiments, this override capability may be enabled by an override enable signal provided to the trip criterion selector circuit 462. This enable signal may be provided, for example, by a signal source external to the circuit interruption device 500.

Figure 6:
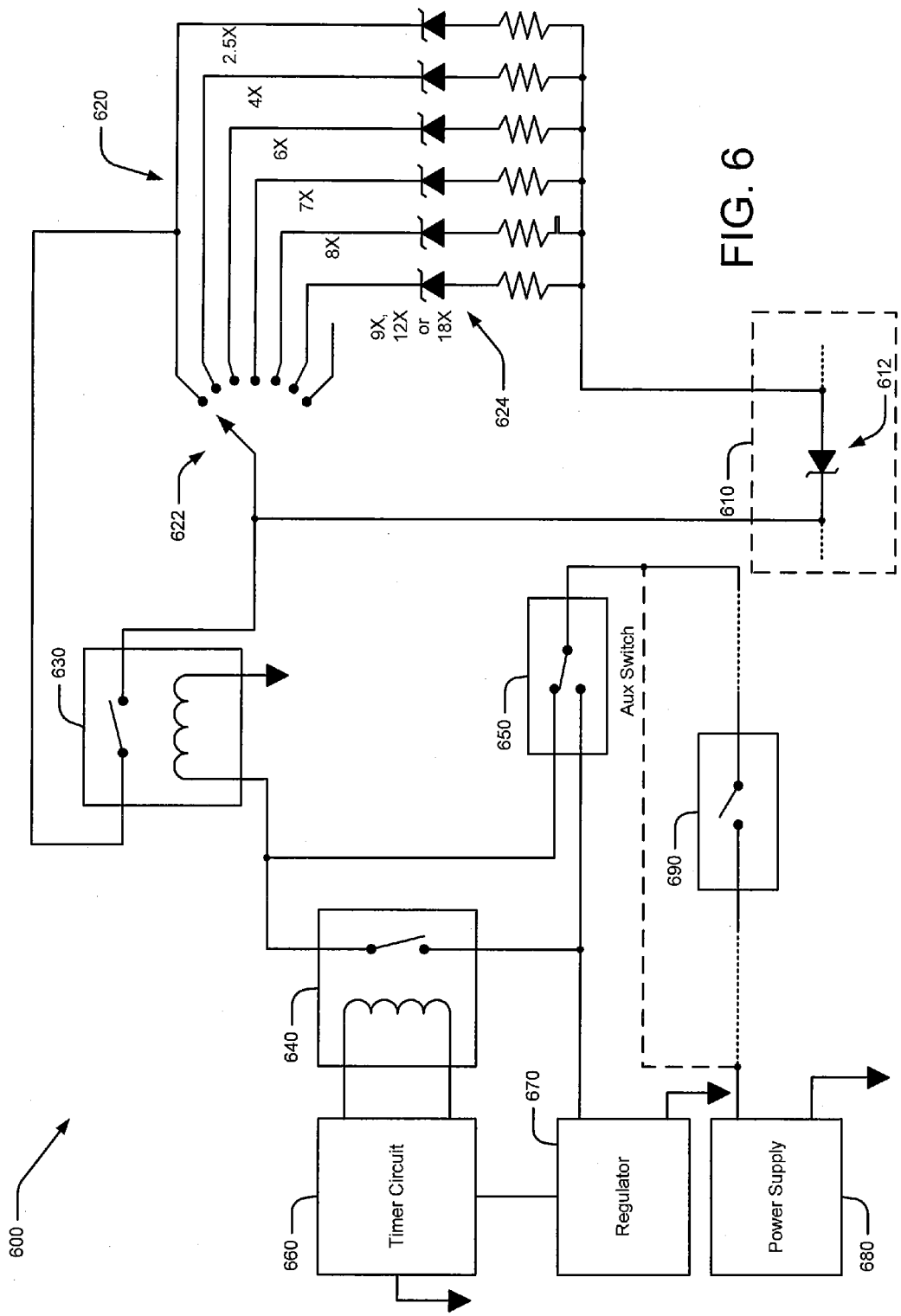
FIG. 6 is a schematic block diagram illustrating a trip criterion selector circuit according to further embodiments.

FIG. 6 illustrates a trip control circuit 600 providing functionality as discussed above with reference to FIGS. 3-5. The trip control circuit 600 includes a driver circuit 610 which is used to energize a trip coil that drives a contact actuator of a circuit interruption device. The driver circuit 620 may take the form, for example, described in the aforementioned U.S. Patent Application Publication No. 2009/0195337 to Carlino et al., the contents of which are incorporated herein by reference in their entirety. The trip driver circuit 610 is coupled to a user input circuit 620, which includes a selector switch 622 that is configured to selectively couple zener diode circuits 624 in parallel with a zener diode 612 of the trip driver circuit 610 responsive to a user input to the switch 622. The different zener diode circuits 624 provide different current level tripping thresholds, as explained in the aforementioned U.S. Patent Application Publication No. 2009/0195337 to Carlino et al. Representative trip levels in terms of the rated current of the circuit interruption device are shown in FIG. 6, but it will be appreciated that other trip level settings may be provided.

As further shown, the trip control circuit 600 includes a first relay 630 configured to bypass the selector switch 622 responsive to a second relay 640 and an auxiliary switch 650 that indicates the state of the contact sets of the circuit interruption device. In particular, a voltage source, such as a power supply circuit 680, may be coupled to an input of the auxiliary switch 650. When the contact sets of the circuit interruption device are open, this voltage is provided to the coil of the first relay 630, thus bypassing the selector switch 622 and causing the lowest current level zener diode circuit to be coupled to the zener diode 612 of the driver circuit 610 and setting the circuit interruption device to a lowest of the selectable instantaneous trip levels.

When the contacts of the circuit interruption device close, the auxiliary switch 650 changes state, causing the regulator circuit 670 to be receive power and energize a timer circuit 660. The timer circuit 660 responsively energizes a coil of the second relay 640, causing the coil of the first relay 630 to be energized and the selector switch 622 to be bypassed. After lapse of a predetermined time interval, the timer circuit 660 de-energizes the second relay 640 which, in turn, de-energizes the first relay 630. This causes the trip control circuit 600 to revert to the trip setting established by the selector switch 622. In this manner, the lowest instantaneous trip level setting is momentarily provided when the contacts of the circuit interruption device are reclosed such that, if a fault is present, the device may trip more rapidly with less arc energy. If no hard fault is present, the device eventually returns to the trip level established by the selector switch 622 after a delay determined by the timer circuit 660.

As further shown in FIG. 6, a user may enable and disable this automatic arc reduction mode. For example, a switch 690 may be included in the circuit interruption device or at an external location to control provision of power to the auxiliary switch 650. If the switch 690 is open, provision of power to the auxiliary switch 650 is blocked, causing the first relay to be de-energized and the trip control circuit 600 to use the trip level established by the selector switch 622. If the switch 690 is closed, power is provided to the auxiliary switch 650, enabling the automatic arc reduction mode described above.

It will be appreciated that the circuitry shown in FIG. 6 is provided for purposes of illustration, and that a variety of other circuits may be used to provide substantially the same functionality. For example, circuits that utilize solid state switching devices instead of the relays shown in FIG. 6 may be used, as well as circuits using switching devices in other arrangements.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A circuit interruption device comprising:
   at least one set of contacts;
   a contact actuator mechanism configured to open the at least one set of contacts; and
   a trip control circuit configured to cause the contact actuator mechanism to open the at least one set of contacts responsive to a condition satisfying a first user-selectable trip criterion and to apply a second trip criterion responsive to the opening of the at least one set of contacts.

2. The circuit interruption device of claim 1, wherein the trip control circuit is configured to apply the second trip criterion after a succeeding closure of the at least one set of contacts.

3. The circuit interruption device of claim 2, wherein the trip control circuit is configured to return to application of the first trip criterion after lapse of a predetermined interval following the succeeding closure of the at least one set of contacts.

4. The circuit interruption device of claim 1, wherein the first and second trip criteria correspond to respective current levels.

5. The circuit interruption device of claim 1, wherein the first trip criterion corresponds to a first current level and wherein the second trip criterion corresponds to a second current level less than the first current level.

6. The circuit interruption device of claim 1, wherein the first and second trip criteria are members of a set of user-selectable trip criteria.

7. The circuit interruption device of claim 6, wherein the members of the set of user-selectable criteria correspond to respective current levels and wherein the second trip criterion corresponds to a minimum current level associated with the set of user-selectable trip criteria.

8. The circuit interruption device of claim 1, wherein the trip control circuit is configured to override a user selection of a trip criterion for a predetermined interval following the closure of the at least one set of contacts.

9. The circuit interruption device of claim 1, wherein the trip control circuit comprises a selector switch configured to selectively connect a first terminal to a plurality of second terminals corresponding to a plurality of user-selectable trip criteria, and wherein the trip control circuit is configured to bypass the selector switch responsive to opening of the at least one set of contacts to apply the second trip criterion.

10. The circuit interruption device of claim 9, further comprising an auxiliary switch having an input terminal and first and second output terminals and having a first state wherein the input terminal is connected to the first output terminal and a second state wherein the input terminal is connected to the second output terminal, the auxiliary switch further configured to indicate a state of the at least one set of contacts such that the auxiliary switch is in the first state when the at least one set of contacts is open and in the second state when the at least one set of contacts is closed, and wherein the trip control circuit comprises:
   a first relay having contacts configured to couple and decouple the first terminal of the selector switch and one of the second terminals of the selector switch corresponding to the second trip level and comprising a coil having a first terminal coupled to the first output terminal of the auxiliary switch and a second terminal coupled to a signal ground;
   a second relay having contacts configured to couple and decouple the first terminal of the coil of the first relay and the second output terminal of the auxiliary switch; and
   a timer circuit having a power supply terminal coupled to the second output terminal of the auxiliary switch and configured to drive a coil of the second relay.

11. The circuit interruption device of claim 10, wherein the input terminal of the auxiliary switch is configured to receive an enable signal from a source external to the circuit interruption device.

12. The circuit interruption device of claim 10, wherein transition of the auxiliary switch from the first state to the second state causes provision of power to the timer circuit, energization of the coil of the second relay by the timer circuit to close the contacts of the second relay and thereby energize the coil of the first relay, and de-energization of the coil of the second relay by the timer circuit after the predetermined interval to open the contact of the second relay and de-energize the coil of the first relay.

13. An apparatus comprising:
   a selector circuit; and
   a trip control circuit coupled to the selector circuit and configured to generate a trip signal to open a set of circuit interruption device contacts based on a user-selectable first trip criterion and to apply a second trip criterion responsive to the opening of the circuit interruption device contacts.

14. The apparatus claim 13, wherein the trip control circuit is configured to apply the second trip criterion after a succeeding closure of the circuit interruption device contacts.

15. The apparatus of claim 14, wherein the trip control circuit is configured to return to application of the first trip criterion after lapse of a predetermined interval following the succeeding closure of the circuit interruption device contacts.

16. The apparatus of claim 13, wherein the first and second trip criteria correspond to respective first and second current levels and wherein the second current level is less than the first current level.

17. The apparatus of claim 13, wherein the selector circuit comprises a selector switch configured to selectively connect a first terminal to a plurality of second terminals corresponding to a plurality of user-selectable trip criteria, and wherein the trip control circuit is configured to bypass the selector switch responsive to opening of the breaker contacts to apply the second trip criterion.

18. A circuit interruption device comprising the apparatus of claim 13.

19. A method of operating a circuit interruption device, the method comprising:
   opening at least one set of contacts of the circuit interruption device responsive to a condition satisfying a first user-selectable trip criterion; and
   applying a second trip criterion for opening of the at least one set of contacts responsive to the opening of the at least one set of contacts.

20. The method of claim 19, wherein applying a second trip criterion for opening of the at least one set of contacts responsive to the opening of the at least one set of contacts comprises applying the second trip criterion after a succeeding closure of the at least one set of contacts.

21. The method of claim 20, further comprising returning to application of the first trip criterion after lapse of a predetermined interval following the succeeding closure of the at least one set of contacts.

* * * * *